PRIVATE LINE VOICE COMMUNICATION SYSTEM

Filed Sept. 23, 1953 3 Sheets-Sheet 1

INVENTOR
WALTER C. LANNING
BY
Thomas M. Ferrill, Jr.
ATTORNEY

Oct. 15, 1957 W. C. LANNING 2,810,122

PRIVATE LINE VOICE COMMUNICATION SYSTEM

Filed Sept. 23, 1953 3 Sheets-Sheet 2

INVENTOR
WALTER C. LANNING
BY
Thomas M. Ferrill Jr.
ATTORNEY

INVENTOR
WALTER C. LANNING
BY
Thomas M. Ferrill, Jr.
ATTORNEY

United States Patent Office 2,810,122

Patented Oct. 15, 1957

2,810,122

PRIVATE LINE VOICE COMMUNICATION SYSTEM

Walter C. Lanning, Plainview, N. Y., assignor to Sperry Rand Corporation, a corporation of Delaware Application September 23, 1953, Serial No. 381,840

5 Claims. (Cl. 340—345)

This invention relates to private line communication systems, and more particularly, is concerned with an address selector system by means of which a transmitting station may single out any one of a number of receiving stations.

Radio intercommunication systems are well known in the art in which a number of receiving stations are in communication with a master station, such as in the police call systems or the taxicab call systems. In general these systems provide for a voice signal to be transmitted by the master station which is received by all of the substations. It is necessary for the operator at the substation to listen to all the messages and to single out therefrom those messages which are directed to him. This constitutes a disadvantage in the intercommunication system because the substation operators are constantly exposed to a continuous garble of messages from which the substation operator must be alert to single out those messages important to the one substation in particular.

It has therefore been recognized that an improved intercommunication system should provide means by which only those messages directly concerning a particular substation would be received by that substation. Several systems heretofore have been proposed in the prior art for accomplishing this result. One such method employs a number of different carrier frequencies with each of the substations tuned to a different frequency. Thus only messages carried on a particular carrier frequency are received by a particular substation. The objections to such a system, however, are that the number of substations is limited by the band width of the transmitter, in relation to the frequency band assignable to the service, and the carrier frequencies must be held to very close tolerances, generally requiring separate crystal control for each substation.

Another solution heretofore proposed is the use of a common carrier frequency for all the substations but impressing an identifying tone differing in frequency for each of the substations. Again, to use such a system with a large number of substations results in closely spaced tone signals to limit the modulation side bands. Thus close tolerances are required in establishing the modulation frequencies, resulting in a complicated and expensive system as the number of substations is increased.

Still another solution is the address selector system described in the copending application Serial No. 377,357, filed on August 31, 1953, in the name of Richard Phelps, in which an identifying pulse code is sent out prior to the transmission of the voice message, the pulse code being received by all the substations with only that substation which is actuated by the code message being gated to receive the voice message following. The system described therein, while providing the desired results and being an adequate solution to the problem, has proved to be somewhat complex in its circuitry.

The general object of the present invention is to avoid and overcome the foregoing and other difficulties of and objections to the prior art practices by the provision of an improved transmitter suitable for use in a private line system that is less complex in construction and circuitry and more versatile in operation.

Another object of this invention is the provision of a radio transmitter with which any one of a large number of receiving stations can be individually called and a private conversation carried on with the called station to the exclusion of all other stations.

Another object of this invention is to provide a radio transmitting system by means of which the number of receiving stations may be readily increased up to any number without varying the band width requirements of the transmitter carrier signal.

Another object of this invention is to provide a private line transmitting system in which all substations can be called simultaneously in an emergency.

These and other objects of the invention which will become apparent as the description proceeds are achieved by the provision of a transmitter for a private line system having a master station and a plurality of substations, the master station including a clock pulse source which is coupled to the modulation input of a transmitter through a gate. A long pulse generator couples a long pulse to the transmitter simultaneously with the first output pulse from the pulse generator, the long pulse also triggering the gate "open" to start a train of pulses from the source to the transmitter. The gate is "closed" after a pre-determined number of pulses following the long pulse, the number of pulses passing through the gate being representative of the first digit of a decimal code number identified with a particular substation. The number of pulses passed is accurately controlled by an electronic counter connected to the output of the gate. The counter is pre-set by a ten-position switch so as to produce an output pulse after a pre-determined number of input pulses, according to the digit selected. The output of the counter closes the gate.

If more than ten substations are required, additional digits in the decimal number may be coded. This is accomplished automatically by coupling the output pulse from the counter through a delay network back to the long pulse generator, the delayed output pulse from the counter triggering the long pulse generator to start the above described cycle over again. A second ten-position switch is provided for setting up the proper pre-set condition on the counter for the second digit. The gate is opened again by the second long pulse and closed by the counter after a pre-determined number of pulses representative of the second digit. Additional digits may be coded in the same manner. Thus an identification code is transmitted which includes a group of long pulses, one for each digit of the decimal code number. Each long pulse is followed by a series of short pulses, the number of which is indicative of a particular digit in the selected decimal code number.

The counter circuit in the sending station responds to pulses up to sixteen so that digits larger than ten can be utilized by providing pulse code groups including up to sixteen short pulses. These digits over ten can be used to contact all receiving stations by presetting all of the receiving stations to stand by in response to a short pulse group of, for example, twelve pulses.

An illustrative receiving station is disclosed herein which is the subject of co-pending U. S. patent application Serial No. 626,690, filed December 6, 1956, in the name of Walter C. Lanning, and assigned to the present assignee.

For a better understanding of the invention reference should be had to the accompanying drawings, wherein.

Figure 1:
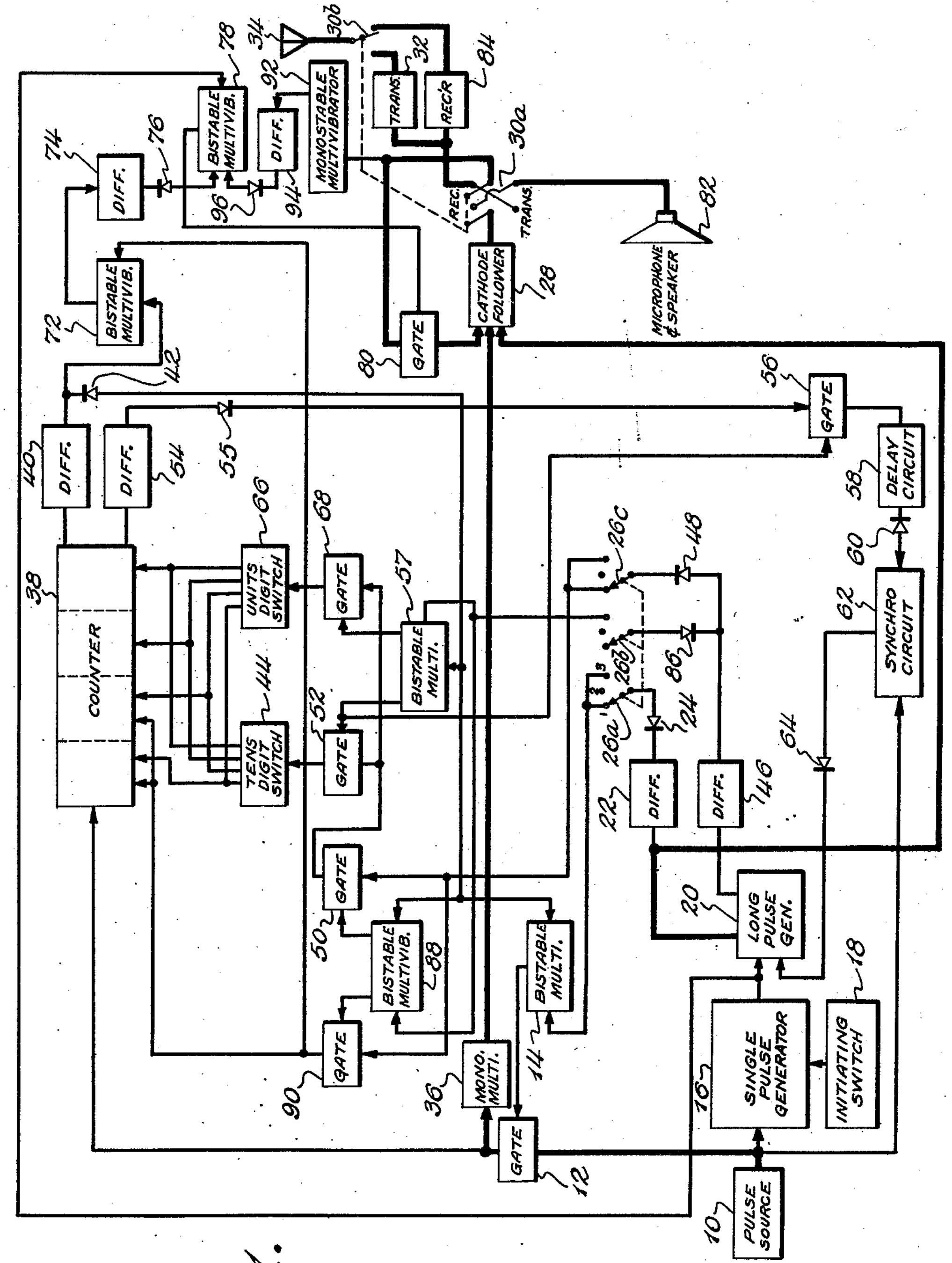
Fig. 1 is a schematic block diagram of the master station.

Referring to the schematic block diagram of the master station shown in Fig. 1, the numeral 10 indicates generally a pulse source which is preferably a free-running blocking oscillator that produces a series of clock pulses at intervals of the order of 500 microseconds. The output of the pulse source 10 is connected to the input of a conventional gate 12 that comprises a single tube which is biased conducting or non-conducting by bistable multivibrator 14. By virtue of the initial stable condition set into the multivibrator 14, the gate 12 is initially non-conducting so that the pulses from the pulse source 10 are blocked at the gate 12. It should be noted that the multivibrator 14, as well as all the other bistable multivibrators in the master station circuit, is set to a predetermined initial stable condition prior to the start of the address and message transmission to a particular substation. The initial set of the multivbrators is readily accomplished by coupling each through a common switch to a bias voltage source. Such technique is well known and has been purposely omitted from the drawings so as not to unnecessarily complicate the diagrams.

The output of the pulse source 10 is also coupled to a synchronous single pulse generator 16 which will be hereinafter described in more detail in connection with Fig. 5. In operation, the synchronous pulse generator 16 produces a single output pulse synchronous with the first input pulse from the pulse source 10 following the closing of an initiating switch 18. The single pulse output of the pulse generator 16 in turn is coupled to a long pulse generator 20 in the form of a monostable multivibrator which generates simultaneously a pair of rectangular pulses having a pulse time duration of the order of 200 microseconds, with one of the output pulses being positive and the other output pulse being negative in polarity.

The positive pulse from the long pulse generator 20 is differentiated by an R–C type differentiating circuit 22 that emits a positive spike followed by a negative spike corresponding in time respectively to the leading and lagging edges of the positive rectangular long pulse. To block the positive spike and transmit the negative spike, a crystal diode indicated at 24 is provided. It should be noted that the diode 24, as well as similar diodes used throughout the circuit, conducts positive pulses only in the direction of the arrow (in the schematic showing) and conducts negative pulses only in the direction opposite to the direction of the arrow. The negative spike from the differentiating circuit 22 is therefore passed by the diode 24 through a switch 26*a*, set in its No. 1 position, to the multivibrator 14, the negative spike reversing the stable state of the multivibrator 14 and opening the gate 12. Thus the gate 12 is opened substantially 200 microseconds after the first synchronizing pulse from the pulse source 10 is emitted following the closing of the initiating switch 18.

The positive long pulse from the long pulse generator 20, in addition to opening the gate 12, is simultaneously coupled by a cathode follower 28, through a section 30*a* of a transmit-receive switch, and to the modulation input of a transmitter 32, the output of which is coupled through section 30*b* of the transmit-receive switch to an antenna 34. Thus first a long pulse is transmitted by the master station.

With the gate 12 now open, the succeeding clock pulses from the source 10, occurring at 500 microsecond intervals, are coupled by the gate 12 to a monostable multivibrator 36, which produces a rectangular short output pulse of 100 microseconds duration with each input pulse from the source 10. These rectangular short pulses from the multivibrator 36 are coupled through the cathode follower 28 and switch 30*a* to the transmitter 32 subsequent to the transmission of the long pulse.

As pointed out heretofore in the brief description of the invention, the number of short pulses following the first long pulse sent out by the transmitter of the master station is representative of the first digit, that is, the tens digit of a two-digit number of the code number of the particular substation which is being contacted. For reasons which will hereinafter become apparent, the number of short pulses transmitted is always one more than the digit number of the decimal code number. Thus if substation "*ab*" is being contacted where *a* and *b* represent the two digits of the decimal code number, $a+1$ short pulses are transmitted following the first long pulse. The number of short pulses transmitted is controlled by the closing of the gate 12 after a predetermined number, namely, $a+1$ short pulses, have been passed by the gate. This is accomplished by apparatus now to be described.

The short pulses at the output of the gate 12 are coupled to the triggering input of a counter 38 of a type including four binary stages. Each of the binary stages includes a bistable multivibrator which is triggered alternately to each of its two stable conditions by successive input triggering pulses. Each binary stage passes a single pulse on to the next stage with each two triggering pulses applied thereto, so that a maximum of 16 pulses at the triggering input of the counter 38 may be required to produce a single output pulse at the other end thereof. However, any number of input pulses less than 16 may be made sufficient to produce the output pulse from the fourth binary stage by pre-setting each of the binary stages to an initial condition in which a desired number of pulses less than sixteen, when fed to the counter 38, will produce an output pulse therefrom.

Such a counter has sixteen stable states which may be numbered for convenience from #0 to #15. Assuming again that the code number to be transmitted is "*ab*," if the counter is initially set to the $\#(15-a)$ stable state, the addition of "*a*" input pulses from the gate 12, corresponding to the tens-digit of the decimal code number, will bring the counter to its last or #15 stable condition, and one additional pulse from the gate 12 will return the counter to its #0 stable state and produce a single output pulse from the counter 38.

This output pulse from the counter 38 is differentiated by a differentiating circuit 40 with the negative spike of the differentiating pulse being coupled by a crystal diode 42 back to the bistable multivibrator 14, the negative spike reversing the multivibrator 14 and closing the gate 12 thus cutting off the flow of short pulses to the transmitter after passage of $(a+1)$ pulses.

To set the counter 38 to the desired initial stable state for the tens-digit of the decimal code number, a ten-position, four-pole switch 44 is provided, the ten positions corresponding to the digits 0 through 9. The four poles of the switch are connected respectively to each of the four binary stages of the counter 38. The tens-digit switch 44 is set to the proper number prior to transmission to the particular substation.

When the initiating switch 18 is closed, a negative long pulse is produced by the long pulse generator 20 as above described. This negative long pulse is differentiated by a differentiating circuit 46, producing at the output thereof a negative spike followed by a positive spike, the spikes corresponding in time respectively to the leading and lagging edges of the negative long pulse. The positive spike is coupled by means of a crystal diode 48 through the switch 26*c*, which is ganged to the switch 26*a* and also set to the No. 1 position. The switch 26*c* connects the positive spike passed by the diode 48 to the input of a gate 50, which is initially open. The output pulse from the gate 50 is coupled through another gate 52, which is also initially open, to the tens-digit switch 44, where it is connected to certain of the binary stages of the counter 38 depending upon the position of the switch 44, so as to set up the proper pre-set condition on the counter 38.

To automatically set up and transmit the next code group corresponding to the units digit of the decimal code number of the substation being addressed, the last binary stage of the counter 38 is coupled to a differentiating circuit 54. When the counter 38 returns to its zero condition, the differentiating circuit 54 produces a positive output pulse which is passed by a crystal diode 55 to a gate 56. A bistable multivibrator 57 operates the gate 56, the initial condition of the multivibrator 57 biasing the gate 56 conductive so that it is initially open. The positive pulse from the differentiating circuit 54 is therefore passed by the gate 56 to a delay circuit 58 which produces a negative output pulse an interval of time following the input pulse, the delay time being of the order of twenty times the pulse repetition rate of the clock pulse source 10. The delay circuit 58 preferably comprises a monostable multivibrator with a differentiating circuit at the output, whereby a negative output pulse is produced corresponding in time to the lagging edge of the rectangular wave generated by the monostable multivibrator.

This delayed negative pulse from the delay circuit 58 is coupled by means of a diode 60 to a synchronizing circuit 62 which comprises a bistable multivibrator that is also coupled to the output of the pulse source 10. The positive pulses from the source 10 set the multivibrator to one of its stable states. The negative pulse from the delay circuit 58 reverses the multivibrator, but the next pulse from the source 10 again returns the multivibrator to its initial state. By differentiating the output of the multivibrator, a positive spike is derived from the synchronizing circuit 62 that is synchronous in time with the first clock pulse from the pulse source 10 following the delayed output pulse from the delay circuit 58. This positive spike is coupled by a crystal diode 64 to the long pulse generator 20 to trigger out a second long pulse, thereby starting the above-described cycle over again for transmitting the second pulse code group of the decimal code number.

Again the positive version of the long pulse output is differentiated, the negative spike opening the gate 12 and starting a second group of short pulses from the pulse source 10 that are passed to the transmitter 32 following the second long pulse from the generator 20.

In order to pre-set the counter 38 to the complement of the units digit, i. e., to the #(15–*b*) stable state, a second ten-position, four-pole switch 66 is provided which is set to the proper units-digit of the decimal code number. The positive differentiated output pulse from the differentiating circuit 46 is again connected through the switch 26c to the open gate 50 and thence coupled to a gate 68. Gates 52 and 68 are controlled by the bistable multivibrator 57 which is triggered by the negative pulse from the differentiating circuit 40.

Thus the first output pulse from the counter 38 following the first long pulse from the long pulse generator 20 triggers the multivibrator 57 causing the gate 52 to close and the gate 68 to open. With the gate 68 open, the positive pulse produced by the differentiation of the second long pulse output of the long pulse generator 20 and passed by the gate 50 is coupled by the gate 68 to the units-digit switch 66, which distributes the pulse to the proper binary stages of the counter 38 so as to pre-set the counter according to the setting on the switch 66.

As previously described, the counter produces an output pulse according to its pre-set condition after a predetermined number of input pulses from the pulse source 10 have passed by the gate 12. The output pulse from the counter 38 is differentiated and coupled to the multivibrator 14 which when triggered closes the gate 12 thus limiting the number of short pulses passed through to transmitter 32 to a predetermined number representing the units-digit of the decimal code number. Gate 56 having been closed by the triggering of the multivibrator 57, the second output from the counter 38 cannot initiate a third cycle.

It will be seen from the description of the master station as thus far described that two long pulses, each followed by a series of short pulses corresponding in number to one more than the number of the respective digits of the decimal code number, are first sent out from the transmitter 32. A pair of negative pulses is produced at the output of the differentiating circuit 40, the respective pulses corresponding in time to the termination of each of the short pulse code groups. These pulses from the differentiating circuit 40 are coupled to a bistable multivibrator 72 which functions as a single binary counter producing an output following two input triggering pulses. Thus, following the second pulse from the differentiating circuit 40, a single negative pulse is produced by a differentiating circuit 74 connected to the output of the multivibrator 72, the negative pulse being coupled by means of a diode rectifier 76 to another bistable multivibrator 78 which controls a gate 80. The gate 80, being initially closed, is opened by the multivibrator 78 following the second output pulse from the differentiating circuit 40, that is, the gate 80 is opened following the completion of the transmission of the two pulse code groups representative of the two digit decimal code number.

The gate 80 is part of the audio circuit of the transmitting and receiving circuits of the master station, which includes a transducer 82 that serves both as a microphone and a speaker. With the transmit-receive switch 30 set for transmission, the operator may speak into the transducer 82, the voice signal being connected by the transmit-receive switch 30a to the gate 80, which is open following the transmission of the code number, and is coupled by means of the cathode follower 28 to the modulation input of the transmitter 32 for transmission to the contacted substation.

To receive the messages from the contacted substation, the transmit-receive switch 30 is reversed, connecting the antenna 34 to a receiver 84, the output of the receiver being coupled by the switch 30a through the gate 80, cathode follower 28, and again by the switch 30a to the transducer 82.

To terminate the transmission to a particular substation, the switch 26 is moved to its No. 2 position and the initiating switch 18 is actuated. The resulting single pulse from the pulse generator 16 is coupled to the multivibrator 78 changing it to its other stable state, and thereby closing the gate 80 so that no more local transmission can occur. At the same time the long pulse generator 20 produces one long pulse which is transmitted to the substation by the transmitter 32, this long pulse gating off the audio circuits of the substation, in a manner hereinafter described, to end the call.

One of the features of the private line system of the present invention is that an emergency call may be sent out to all substations simultaneously. This is achieved by transmitting a special code which opens up all the substations for reception. To transmit a two-digit decimal code number, a chain of pulses representative of each of the two digits is transmitted. The number of pulses in each group varies between one and ten. However, the counter 38 is capable of counting pulses up to 15. This means that additional code groups are available in addition to the groups representing the digits from zero to nine. One of these additional code numbers may be used to provide an emergency call, each of the substations being designed to recognize the emergency call number and to open for reception in response to such number.

For emergency call operation, the switch 26 is set to the No. 3 position. As before, actuating the initiating switch 18 results in a long pulse being transmitted and a simultaneous opening of the gate 12 to start the transmission of a chain of clock pulses from the pulse source 10. Under emergency operation, the negative spike in the output of the differentiating circuit 46 is coupled by a crystal diode 86 through the switch 26*b* to a bistable multivibrator 88 which controls the gating bias of gate 50. The negative pulse trips the multivibrator 88 to its other stable condition whereby the gate 50 is closed and another gate 90 is opened.

The positive spike at the output of the differentiating circuit 46 is coupled by the diode 48 to the switch 26*c*, which in its No. 3 position connects the positive spike to the gate 90, the output of which is connected to the first two binary stages of the counter 38 to pre-set the counter to the proper condition to produce an output pulse following a particular number of input pulses from the pulse source 10 in excess of ten pulses, for example, twelve pulses.

Thus the counter 38 turns off the gate 12 after a short pulse group is transmitted having a number of pulses greater than used in transmitting the digit of a decimal code number.

The output pulse from the gate 90 is also coupled to the bistable multivibrator 72, reversing its stable state, so that the first negative pulse derived by differentiation of the output of the counter 38 triggers the multivibrator 72 back to its initial condition thereby producing an output which, when differentiated at 74, trips the multivibrator 78, and opens the gate 80 to permit local transmission to all substations.

To permit a substation to call in to the master station when no transmission is being undertaken by the master station, the transmit-receive switch 30 is left in its receive position. Under these circumstances a short pulse sent out by the substation and received by the master station is connected from the receiver 84 through the switch 30*a* to a monostable multivibrator 92; triggering of the multivibrator 92 produces a rectangular output pulse which is differentiated by the differentiating circuit 94. The negative spike of the differentiated output is coupled by a diode rectifier 96 to the multivibrator 78, which responds thereto to open the gate 80 permitting reception by the master station of the subsequent vocal message from the substation.

Figure 2:
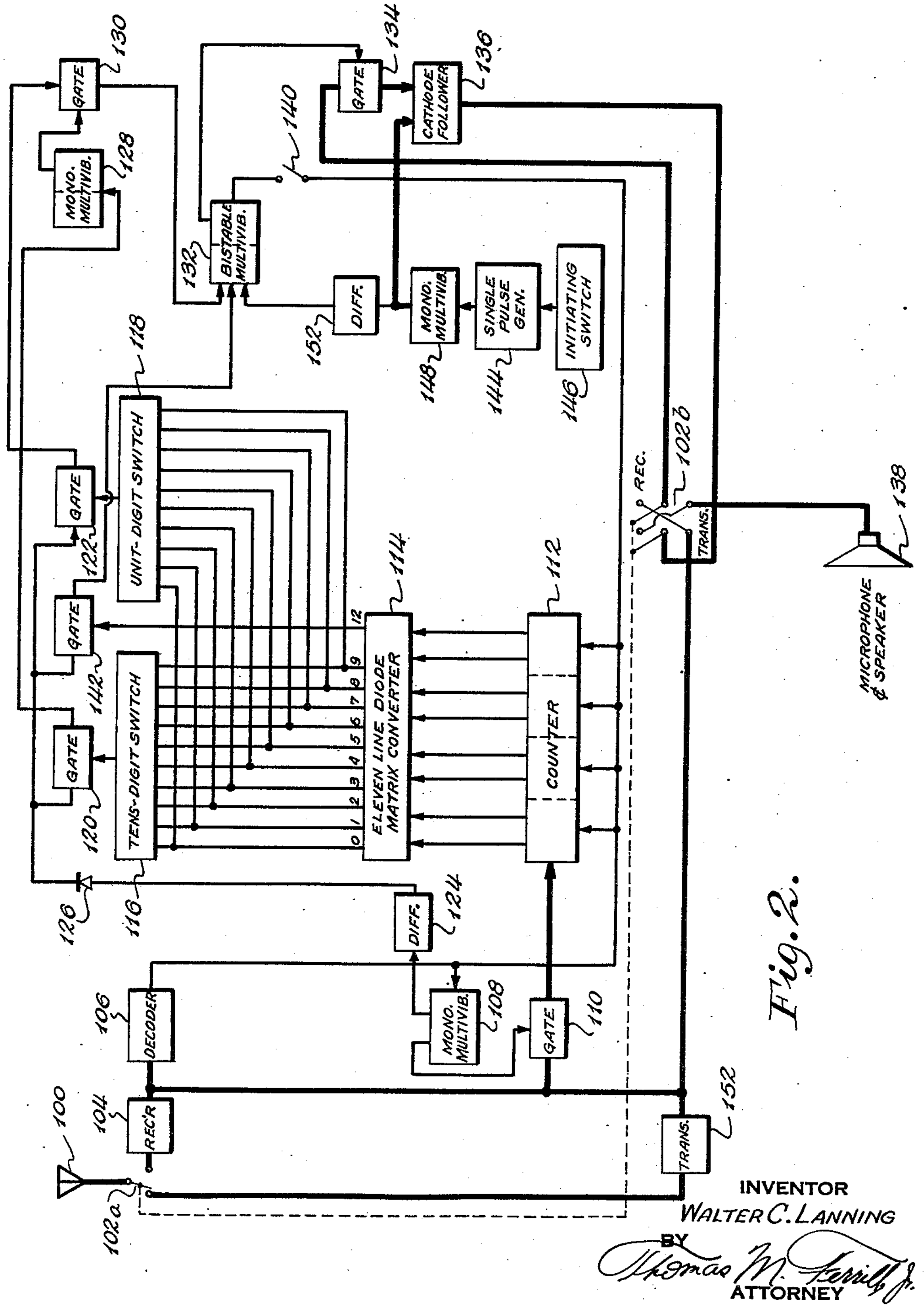
Fig. 2 is a schematic block diagram of one of the substations.

Referring to the block diagram of a substation as shown in Fig. 2, the signal from the master station is picked up by the antenna 100 and connected through a section 102*a* of a transmit-receive switch to a receiver 104. The demodulated output signal from the receiver 104, which includes a long pulse for each digit of the code number with each long pulse followed by a series of short pulses representative of one of the respective digits of the code number, is connected to a decoder circuit 106 which will hereinafter be described in greater detail. In operation, the decoder 106 produces an output signal in response to the first as well as subsequent long pulses but does not respond to any pulses of shorter or longer duration. The output pulse from the decoder 106 following the first received long pulse triggers a monostable multivibrator 108 that opens the gate 110 for a period as determined by the period of the monostable multivibrator. The recovery time of the multivibrator 108 is much as to hold the gate 110 open for a sufficient period to permit the passage of a maximum of sixteen short pulses from the receiver 104.

With gate 110 open, the short pulse code group following the initial received long pulse is coupled by the open gate 110 to the triggering input of a counter 112 having four binary stages. The output pulse from the decoder 106 is simultaneously coupled to each of the four stages of the counter 112 to set the counter to its maximum pulse count condition, namely, the #15 stable state. Thus the first short pulse from the gate 110 returns the counter 112 to its zero condition with subsequent short pulses from the gate 110 causing the counter to count up to the first digit of the code number, since the number of pulses received is always one more than the digit number, as explained above. In other words, with the first digit $a$ of the code number set at the master station, $(a+1)$ pulses are actually transmitted, but the counter 112 counts up to $a$, since the first pulse returns the counter to zero after it is initially set at the #15 stable condition by the output of the decoder 106.

The binary counter 112 is connected in parallel into an eleven-line diode matrix converter 114. Such diode matrix converters are well known in the art for translating a number from binary to decimal notation. See for example, "High-speed Computing Devices," by Engineering Research Associates, McGraw-Hill Publishing Company, pages 40 to 43. The diode matrix converter, in addition to translating the binary numbers from zero to nine to decimal notation, further includes another matrix line for converting the emergency call number 12 from binary to decimal notation.

In operation, any particular binary number set up on the counter 112 energizes one of the eleven output lines of the diode matrix converter. For example, where the first digit of the code number is 9, the counter 112, as heretofore explained, stops at the #9 stable condition, which by means of the diode matrix converter 114 results in a positive potential being applied to the #9 output line of the converter.

A pair of ten-position, single pole switches 116 and 118 selectively connect one of the ten lines respectively to the gates 120 and 122. Switch 116 is pre-set to the tens-digit of the code number of the particular substation, while the switch 118 is pre-set to the units-digit of the code number of that substation. If the position of the switch 116 corresponds to the first digit of the code number as sent out by the master station, the particular output line from the diode matrix converter 114 which is energized by the counter 112 is connected by the switch 116 to the gate 120, whereby the gate 120 is opened. With the gate 120 open, when the multivibrator 108 returns to its stable state, by means of a differentiating circuit 124, a positive spike is produced which is coupled by means of a diode 126 through the now open gate 120 to the trigger input of a monostable multivibrator 128. The period of the monostable multivibrator 128 is greater than the time between long pulses as sent out by the master station, so that the multivibrator 128, when triggered, holds a gate 130 open while the second digit or group is being received.

The second digit code group of the code number as transmitted by the master station includes a long pulse which is decoded by the decoder 126 to open the gate 110 in the manner as above described, the successive short pulses being passed by the gate 110 to the counter 112, which has been returned to its #15 stable condition by the output of the decoder 106. The counter 112 is thereby set to the proper binary number corresponding to the units-digit of the decimal code number. This binary code number on the counter 112 is converted by the diode matrix converter 114 so as to energize the corresponding decimal number output line going to the units-digit switch 118.

It should be noted that, although a number of the output lines from the diode matrix may be energized during the time the short pulses are received, these cannot affect the operation since only the line energized following the last short pulse of a group can hold the gates 120 or 122 open at the time a pulse is received from the multivibrator 108. The fact that both digits of the pulse code are the same does not matter, even though both gates 120 and 122 are held open following each short pulse group, since the gate 130 does not open in time to pass the first pulse from the gate 122.

If the switch 118 is set to the proper units-digit, corresponding to the code number sent out by the master station, the gate 122 is opened. The negative pulse resulting from the return of the multivibrator 108 to its stable condition passes through the open gate 112 and the open gate 130 (held open by the multivibrator 128) to trigger a bistable multivibrator 132. Reversal of the stable condition of the multivibrator 132 by the second negative pulse from the multivibrator 108 opens a gate 134. With the gate 134 open, the received voice message following the address code is connected from the receiver 104 through the transmit-receive switch 102*b* through the gate 134 to a cathode follower 136. The transmit-receive switch in turn connects the output of the cathode follower 136 to a transducer 138 which serves both as a microphone and a speaker.

The long pulse sent out by the master station at the termination of the message is decoded by the decoder 106 and connected by a switch 140 to the multivibrator 132, the output of the decoder reversing the stable condition of the multivibrator 132 and closing the gate 134, thereby preventing any further signals from getting through to the speaker 138.

When an emergency message is sent out by the master station, the initial long pulse is detected by the decoder 106, causing the gate 110 to be opened and the subsequent short pulse group to be coupled to the counter 112. Since the number 12 has been selected as the code for emergency calls, 13 short pulses are received which set the counter 112 in the #12 stable condition, in which condition is energizes the output line #12 from the diode matrix converter 114, opening a gate 142. When gate 142 is open, the subsequent negative pulse from the differentiating circuit 124, occurring with the return of the multivibrator 108 to its stable condition, is coupled to the multivibrator 132. Reversal of the multivibrator 132 by the gated pulse from the differentiated output of the multivibrator 108 results in the opening of the gate 134, thus permitting the local message which follows to be connected to the microphone-speaker 138.

As mentioned in connection with the master station description, it may be desirable for a substation to contact the master station. This is accomplished by transmitting a single short pulse which, when received by the master station, acts to put the master station in condition to receive the message. This sharp pulse is provided in the substation by a single pulse generator 144 which is triggered by an initiating switch 146. The output of the single pulse generator 144 triggers a monostable multivibrator 148, the output pulse of which, with the transmit-receive switch 102 in the transmitting position, sends a pulse through the cathode follower 136 and transmit-receive switch 102, to a transmitter 150, the output of which is a modulated carrier signal which is connected by means of the transmit-receive switch 102*a* to the antenna 100. The output of the multivibrator 148 is simultaneously differentiated by differentiating circuit 152 and coupled to the multivibrator 132 for opening the gate 134 to permit reception of any subsequent messages from the master station.

The switch 140 permits the substation to listen to all messages sent out by the master station regardless of the particular decimal code number transmitted, since when the switch 140 is left open, the gate 134 will remain open, no pulse from the decoder 106 being connected to the multivibrator 132 to close the gate 134.

The operation of the private line system of the present invention is apparent from the above description. Most of the circuits represented by the block diagrams of Figs. 1 and 2 are conventional and well-known in the art. Multivibrators, both monostable and bistable, gate circuits, differentiating circuits, transmitters and receivers are well-known and are used in a conventional manner in the present invention. The counters 38 ad 112 are of a coventional type including four cascaded bistable multivibrator or binary stages, each of which produces one output pulse for each two input pulses applied thereto. Such counters are described in detail in "Waveforms," vol. 21, MIT Radiation Laboratory Series, McGraw-Hill Publishing Co., p. 605.

Figure 3:
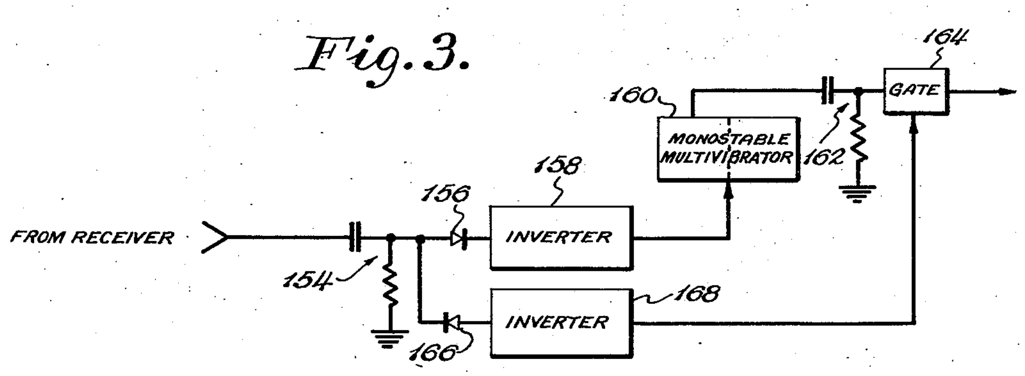
Fig. 3 is a schematic diagram of a pulse decoder used in the substation.
Figure 4:
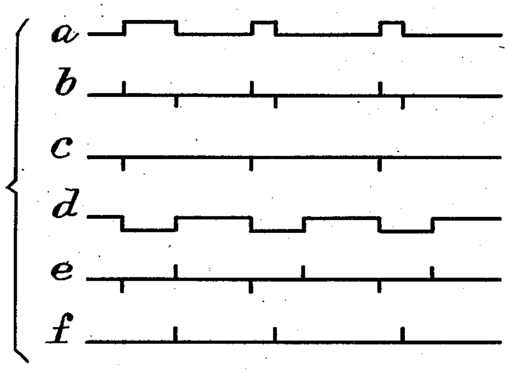
Fig. 4 is a set of graphical representations drawn to a common time scale and used in explaining the mode of operation of the decoder of Fig. 3.

The decoder 106 used in the substation may be any one of a number of such circuits described in the prior art for recognizing a pulse having a particular time duration. A preferred and novel decoder is shown in Fig. 3. The signal input of the decoder as described from the output of the receiver 104 includes a long pulse of 200 microseconds followed by a train of shorter pulses, as heretofore described, the input signal of the decoder being shown graphically in Fig. 4*a*. The input signal is differentiated by an R–C differentiating circuit indicated at 154, the output from the differentiating circuit comprising a series of positive spikes each followed by a negative spike, the positive spikes and negative spikes corresponding in time respectively to the leading and lagging edges of the pulses from the receiver, as shown graphically in Fig. 4*b*. For the purpose of changing the polarity of the spikes, the positive spikes of the differentiated signal are coupled by a crystal diode 156 to an inverter 158, the output of which is a series of negative spikes as shown in Fig. 4*c*, corresponding in time to the leading edges of the pulses derived from the receiver 104. These negative pulses at the output of the converter 158 trigger a monostable multivibrator 160 which is designed to have a recovery time which exactly matches the pulse time duration of the input pulse to be identified, which in the present case is the long pulse having a 200-microsecond time duration.

The multivibrator 160 produces a series of negative rectangular pulses having a 200-microsecond duration, the same time duration as the long pulses sent out by the master station. The output of the monostable multivibrator 160 is shown graphically in Fig. 4*d*. An R–C differentiating circuit 162 produces a series of negative pulses each followed by a positive pulse corresponding in time respectively to the leading and lagging edges of the rectangular output pulses from the multivibrator 160, as shown graphically in Fig. 4*e*. The differentiated output of the multivibrator 160 is connected to a gate 164.

The negative spikes from the differentiating circuit 154 are coupled by means of a crystal diode 166 to an inverter 168, the output of which is a series of positive pulses, as shown graphically in Fig. 4*f*. It will be noted that the time at which these pulses occur depends on the time duration of the input pulses to the decoder, since they correspond in time to the lagging or trailing edge of these input pulses. The positive output pulses from the inverter 168 are coupled to the gate 164. If they are in time coincidence with the positive pulses from the differentiating circuit 162, an output pulse from the gate 164 is produced. However, if the pulses from the inverter 168 are ahead of or behind the pulses from the differentiating circuit 162, no output pulse is derived from the gate 164. Thus the decoder 106 produces an output pulse only when an input pulse of 200-microseconds duration is received.

Figure 5:
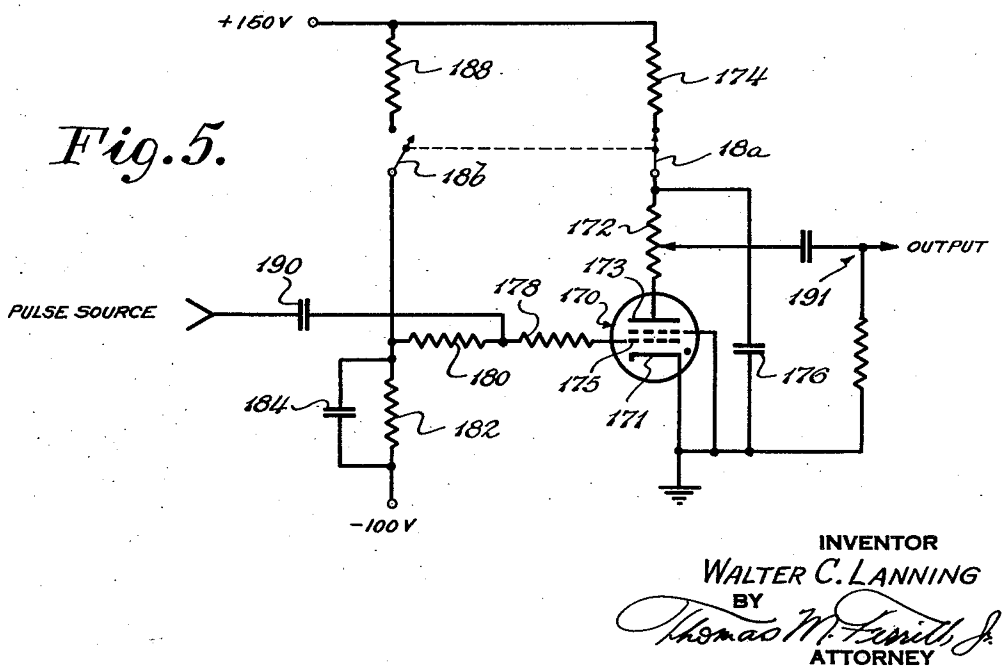
Fig. 5 is a schematic diagram of the synchronous single pulse generator used in the master station.

Another circuit which requires further description is the synchronous single-pulse generator 16 of the master station, the circuit of which is shown in Fig. 5. The circuit includes a gas tetrode 170, the cathode 171 of which is grounded and the anode 173 of which is connected through a potentiometer 172, a switch 18*a*, and a plate load resistor 174 to a B+ supply (not shown). A capacitor 176 is connected to ground and connected to the anode of tube 170 through the potentiometer 172.

The gas tube 170 is held non-conductive by connecting the control grid 175 thereof to a negative voltage source through a pair of resistors 178 and 180, and an R–C network including a resistor 182 and capacitor 184. A switch 18*b* connects the control grid circuit at the junction between the resistor 180 and 182 to the B+ supply through a load resistor 188. Switches 18*a* and 18*b* are ganged together, the switch 18*a* being normally closed and the switch 18*b* being normally open. These ganged switches comprise the initiating switch 18 of the master station as shown in Fig. 1, which is a momentarily actuated or push button type switch.

In operation, the pulse generator circuit of Fig. 5 is coupled to the pulse source 10 by means of a capacitor 190. Positive pulses from the source 10, which have an amplitude of the order of 50 volts, do not trigger the tube 170 since the control grid is held below the firing potential by the minus 100-volt negative voltage source. Initially the capacitor 176 is charged up to substantially the potential of the B+ supply. When the switch 18 is actuated, closing of the switch 18*b* raises the potential of the control grid of the tube 170, as determined by the ratio of the resistors 182 and 180. This ratio is selected to provide a potential which is below the cut-off bias of the tube 170. By virtue of the R–C network 182, 184, the potential of the control grid of the tube 170 rises slowly with the closing of the switch 18*b*, reaching a potential where a pulse from the pulse source 190 is sufficient to trigger the tube 170. This is to prevent arcing or other transient effects associated with the closing of the switch 18*d* from firing the tube 170.

The anode of the tube 170 is held at the B+ potential by the capacitor 176 after the switch 18*a* is open until the tube 170 fires, at which instant the capacitor 176 is discharged through the potentiometer 172, producing a sharp potential drop at the output tap of the potentiometer having an amplitude determined by the setting of the potentiometer 172. An R–C differentiating circuit 191 produces a negative pulse from this change in potential. With the capacitor 176 discharged, no further output pulses can be produced until the switch 18*a* is closed again.

To prevent firing of the tube 170 when the switch 18*a* is closed again and the switch 18*b* is opened, the time constant of the R–C circuit 182, 184 must be much shorter than the charging time constant of the R–C circuit 174, 176. This insures that the potential on the control grid of the tube 170 drops below a level where an input pulse can trigger the tube before the potential of the anode of the tube 170 can rise to a value where the tube can be made to conduct. The slow recharging time of the capacitor 176 also prevents a positive output pulse from being formed when the switch 18*a* is closed.

For operation of the circuit of Fig. 5 as a single pulse generator which is not synchronized by an external pulse source, such as the single pulse generator 144 of the substation as shown in Fig. 2, the value of the resistor 188 is changed so that the potential on the control grid of the tube 170, with the closing of the switch 18*b*, rises to a level where the tube 170 fires, so that no input pulse is required to trigger the single pulse generator.

From the above description of the private line system it will be seen that the various objects of the invention have been achieved by providing a radio intercommunication system whereby reception of a vocal communication is possible only when the code number previously assigned to a particular substation is identical with the code number transmited by the master station. The master station can carry on a vocal communication with any one of a hundred substations without bothering any of the other stations. The system further provides that the master station can simultaneously communicate with all the substations by sending out an emergency code number which opens up all the substations for reception. While the number of stations in the system has been described as 100, it will be seen that the system is readily adaptable to provide for ten times this number, or even more, by providing for additional code groups representing additional digits to be sent by the master station.

The uses of a private line system of the type described are numerous, such as traffic control of aircraft at an airport, in taxi and police cars, and in military applications where a central command post is in constant communication with a number of units in the field including military aircraft and other vehicles. The system provides for two-way communication since each of the substations can contact the master station by transmitting its own pulse to the master station. While the substations have been described as having switching means for setting the respective digits of the decimal code number, some simplification is possible by wiring each substation to respond to its own single code number.

Since many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a private line communication system, means for signalling a particular receiving station from a sending station, said means comprising a transmitter having a modulation input, a source of short clock pulses, a long pulse generator triggered by an initial pulse from said source, the output of said generator being coupled to said modulation input, gating means coupling said source to said modulation input, the gating means being triggered conductive by the output of the long pulse generator, a pulse counter coupled to the output of the gating means, the gating means being triggered non-conductive by the output of the counter, first means for selectively pre-setting the counter to produce an output from the counter after a first predetermined number of input pulses, second means for selectively pre-setting the counter to produce an output from the counter after a second predetermined number of input pulses, switching means for coupling the long pulse generator to either of said first and second means, the switching means being actuated by the output from the counter, and a time delay circuit coupled to the output of the counter, the long pulse generator being triggered in response to the output of the delay circuit.

2. In a private line communication system, means for signalling a particular receiving station from a sending station, said means comprising a transmitter having a modulation input, a source of short clock pulses, a long pulse generator, the output of said generator being coupled to said modulation input, gating means coupling said source to said modulation input, the gating means being triggered conductive by the output of the long pulse generator, first means for triggering said gating means non-conductive after a first predetermined number of short pulses following a first long pulse from said generator, second means for triggering said gating means non-conductive after a second predetermined number of short pulses following a second long pulse from said generator, whereby a modulated output signal defining first and second long pulses each of which is followed by a predetermined number of short pulses is produced.

3. In a private line communication system, means for signalling a particular receiving station from a sending station, said means including at the sending station, means for producing relatively long pulses, means actuated by each long pulse from the long pulse producing means for producing a train of relatively short pulses, first adjustable means actuated by a first long pulse for terminating the train of short pulses after a first predetermined number of short pulses have been produced, said first adjustable means triggering said long pulse generating means to produce a second long pulse after said first predetermined number of short pulses have been produced, second adjustable means actuated by the second long pulse for terminating the train of short pulses after a second predetermined number of short pulses have been produced, whereby two long pulses each followed by a series of a predetermined number of short pulses is produced by the sending station.

4. Means for generating predetermined groups of pulses comprising an output circuit, a source of clock pulses, a pulse producing means coupled to the output of said source and responsive to a control signal for producing an output pulse synchronous with that one of said clock pulses which follows the time of occurrence of said control signal, a long pulse generator triggered by said output pulse to produce an output wave having a leading edge synchronous therewith and a trailing edge a predetermined time thereafter, the output of said generator being coupled to said output circuit, means including first gating means coupling said source to said output circuit, the first gating means being triggered conductive by the trailing edge of said wave, a pulse counter coupled to the output of the first gating means, said first gating means being triggered non-conductive by the output of the counter, first means for selectively presetting the counter to produce a first output from the counter after a first predetermined number of input pulses, second means for selectively presetting the counter to produce a second output from the counter after a second predetermined number of input pulses, switching means for alternately coupling the long pulse generator to one of said first and second means, said first and second means being responsive to the leading edge of said output wave from said long pulse generator and the switching means being actuated by each output from the counter, second gating means coupled to the output of the counter, said second gating means being rendered non-conductive by said second output from the counter, a time delay circuit coupled to the output of said second gating means, and means for coupling the output of said delay means to the long pulse generator for triggering the latter in response thereto.

5. Means for generating predetermined groups of pulses comprising an output circuit, a source of clock pulses, a pulse producing means coupled to the output of said source and responsive to a first control signal for producing an output pulse synchronous with that one of said clock pulses which follows the time of occurrence of said first control signal, a long pulse generator triggered by said output pulse to produce an output wave having a leading edge synchronous therewith and a trailing edge a predetermined time thereafter, the output of said generator being coupled to said output circuit, means including first gating means coupling said source to said output circuit, the first gating means being triggered conductive by the trailing edge of said wave, a pulse counter coupled to the output of the first gating means, said first gating means being triggered non-conductive by the output of the counter, first means for selectively presetting the counter to produce a first output from the counter after a first predetermined number of input pulses, second means for selectively presetting the counter to produce a second output from the counter after a second predetermined number of input pulses, switching means for alternately coupling the long pulse generator to one of said first and second means, said first and second means being responsive to the leading edge of said output wave from said long pulse generator and the switching means being actuated by each output from the counter, second gating means coupled to the output of the counter, said second gating means being rendered non-conductive by said second output from the counter, a time delay circuit coupled to the output of said second gating means, means for coupling the output of said delay means to the long pulse generator for triggering the latter in response thereto, divider means coupled to the output of said counter and adapted to produce a second control signal upon the occurrence of a predetermined one of the outputs of said counter, selective coupling apparatus actuatable by said second control signal, and a modulator, said modulator being connected to said output circuit via said selective coupling apparatus in response to said second control signal.

References Cited in the file of this patent

UNITED STATES PATENTS

| | | |
|---|---|---|
| 888,153 | Franke | May 19, 1903 |
| 1,004,566 | Gill | Oct. 3, 1911 |
| 1,464,565 | Espenschied | Aug. 14, 1923 |
| 1,662,877 | Almquist | Mar. 20, 1928 |
| 1,882,010 | Hershey | Oct. 11, 1932 |
| 1,888,985 | Hershey | Nov. 29, 1932 |
| 1,960,779 | Hershey | May 29, 1934 |
| 2,140,138 | Miller | Dec. 13, 1938 |
| 2,387,444 | Hayslett | Oct. 23, 1945 |
| 2,391,868 | Angel | Jan. 1, 1946 |
| 2,589,130 | Potter | Mar. 11, 1952 |